(12) United States Patent
Lo et al.

(10) Patent No.: US 10,282,042 B2
(45) Date of Patent: May 7, 2019

(54) METHOD AND APPARATUS FOR REDUCING PIN COUNT IN IN-CELL TOUCH DISPLAY DRIVER IC

(71) Applicant: Solomon Systech Limited, Hong Kong (HK)

(72) Inventors: Wai Ming Lo, Hong Kong (HK); Wing Chi Stephen Chan, Hong Kong (HK); Kin Keung Tam, Hong Kong (HK); Jun Chen, Hong Kong (HK); Cheung Fai Lee, Hong Kong (HK)

(73) Assignee: Solomon Systech Limited, Hong Kong (HK)

( * ) Notice: Subject to any disclaimer, the term of this patent is extended or adjusted under 35 U.S.C. 154(b) by 421 days.

(21) Appl. No.: 15/166,256

(22) Filed: May 26, 2016

(65) Prior Publication Data

US 2017/0344145 A1   Nov. 30, 2017

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *G06F 3/0416* (2013.01)

(58) Field of Classification Search
CPC ....... G06F 3/0412; G06F 3/0416; G06F 3/044
See application file for complete search history.

(56) References Cited

U.S. PATENT DOCUMENTS

| 8,760,412 B2* | 6/2014 | Hotelling | G06F 3/0412 345/173 |
| 9,760,231 B2* | 9/2017 | Hung | G06F 3/0412 |
| 9,990,093 B2* | 6/2018 | Lai | G06F 3/044 |

* cited by examiner

*Primary Examiner* — Nelson M Rosario
(74) *Attorney, Agent, or Firm* — Idea Intellectual Limited; Margaret A. Burke; Sam T. Yip

(57) ABSTRACT

Embodiments of an active in-cell sub-pixel in an LCD panel are provided for time multiplexing image display and touch sensing so as to reduce pin counts required in display driver integrated circuits. In one embodiment, the sub-pixel comprises a liquid crystal capacitor, a storage capacitor and an active switching element. One terminal of the liquid crystal capacitor is connectable to a data line via a thin film transistor switch. The active switching element is connected to another terminal of the liquid crystal capacitor, and is externally controllable. In one configuration, the active switching element connects the liquid crystal capacitor to a second common electrode of the panel, causing the display-driving mode to be turned on. In another configuration, the active switching element connects the liquid crystal capacitor to the data line, causing the touch-sensing mode to be turned on.

12 Claims, 14 Drawing Sheets

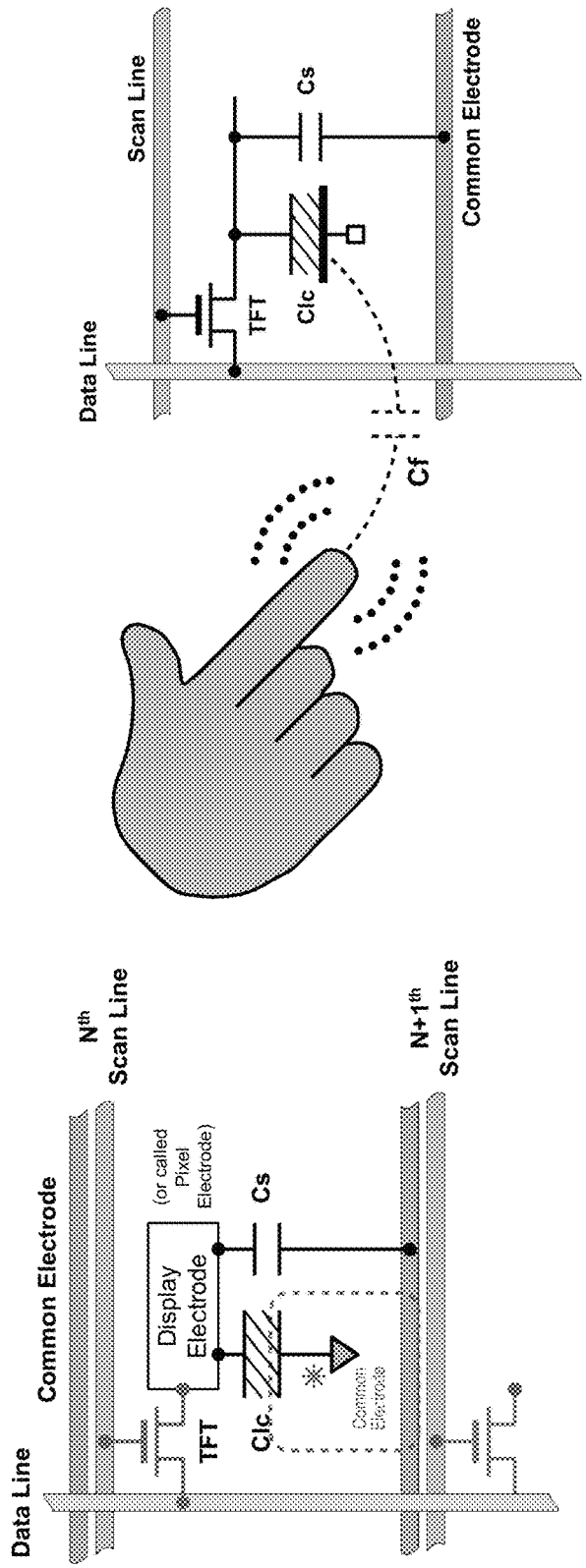

R: red sub-pixel
G: green sub-pixel
B: blue sub-pixel

METHOD AND APPARATUS FOR REDUCING PIN COUNT IN IN-CELL TOUCH DISPLAY DRIVER IC

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to in-cell touch sensing on a liquid crystal display (LCD) panel. In particular, the present invention relates to a method and an apparatus for pin-count reduction in touch display driver integration (TDDI) integrated circuits (ICs).

BACKGROUND

A touch-sensing-enabled active matrix LCD panel is an active matrix LCD display having an additional function of detecting a location of a possible touch made on the panel. The detection may be accomplished by an electrostatic capacitance method. This method is herein referred to as an in-cell self-capacitive touch sensing method.

In the implementation of the in-cell self-capacitive touch sensing method, additional touch sensing channels are required to be integrated into a display driver IC. This two-in-one IC is called a TDDI chip. These additional touch sensing channels may go up to 500 for a five-inch display. For such large number of touch sensing channels, it increases the overall number of pads of the TDDI chip to a level that significantly increases the IC packaging and testing costs.

In U.S. Pat. No. 8,760,412, it is disclosed a display having data lines that can be configured between a display mode and a touch mode. In European Patent No. 1,455,264, it is suggested a driver IC using an active matrix as a means of input such that the display and sensing functions are integrated without a need to modify the active matrix, thereby indirectly reducing a pin count. Despite various efforts in the art for reducing the pin count of a TDDI chip, there is still a need for an improved method and apparatus to further reduce the pin count.

SUMMARY OF THE INVENTION:

A first aspect of the present invention is to provide an active in-cell sub-pixel in an LCD panel. The panel has a Display_Touch signal for controlling the sub-pixels to be in a display-driving mode or a touch-sensing mode. When Display_Touch is logic HIGH, it signals display driving mode. When Display_Touch is logic LOW, it represents touch sensing mode.

The sub-pixel comprises a thin film transistor (TFT), a liquid crystal capacitor, a storage capacitor and an active switching element. Each of the liquid crystal capacitor and the storage capacitor has a first terminal and a second terminal. The first terminal of the liquid crystal capacitor is a first common electrode of the panel. Both the second terminals of the liquid crystal capacitor and of the storage capacitor are connected to a data line when the TFT is on. The active switching element comprises a switch electrode connected to the first terminal of the liquid crystal capacitor. In addition, the active switching element is controllable by the Display_Touch line in a manner as follows. A first voltage on the Display_Touch line configures the active switching element to connect the first terminal of the liquid crystal capacitor to a second common electrode of the panel through the switch electrode, causing the display-driving mode to be turned on. A second voltage on the Display_Touch line configures the active switching element to connect the first terminal of the liquid crystal capacitor to the data line through the switch electrode, causing the touch-sensing mode to be turned on.

In a first embodiment of the active in-cell sub-pixel, the first terminal of the storage capacitor is connected to the second common electrode. Furthermore, the first common electrode and the second common electrode are located on an upper glass substrate and a lower glass substrate, respectively, of the panel.

In a second embodiment of the active in-cell sub-pixel, the first terminal of the storage capacitor is connected to the switch electrode. In addition, the first common electrode and the second common electrode are common and are located on a lower substrate of the panel. The first and the second common electrodes may be collectively referred to as a common electrode.

It is desirable if an active in-cell touch sub-pixel is also configured to provide black insertion. To achieve this purpose, a third embodiment of the active in-cell sub-pixel comprises a thin film transistor (TFT), a liquid crystal capacitor, a storage capacitor and an active switching element. Each of the liquid crystal capacitor and the storage capacitor has a first terminal and a second terminal. Both the second terminals of the liquid crystal capacitor and of the storage capacitor are connected to a data line when the TFT is on. The active switching element comprises a switch electrode connected to the first terminal of the liquid crystal capacitor. In addition, the active switching element is controllable by the Display_Touch line in a manner as follows. A first voltage on the Display_Touch line configures the active switching element to connect the first terminals of the liquid crystal capacitor and of the storage capacitor to a common electrode of the panel through the switch electrode, causing the display-driving mode to be turned on. A second voltage on the Display_Touch line configures the active switching element to short the first and second terminals of the liquid crystal capacitor and of the storage capacitor, causing the touch-sensing mode to be turned on while the panel displays black. The sub-pixel may be of Twisted Nematic (TN) type or of In Plane Switching (IPS) type.

A second aspect of the present invention is to provide an apparatus comprising a display panel and a TDDI chip, where the display panel employs the active in-cell sub-pixel according to one of the three embodiments thereof. The TDDI chip comprises a plurality of display drivers each for driving one data line of the panel during the display-driving mode, a plurality of pads each for electrically connecting to one data line of the panel, and one or more touch analog front ends (TAFEs) for sensing a plurality of touch signals received from the display panel via the plurality of pads. In addition, each of the pads is connected to an individual display driver directly when the data line is purely for display driving, or via a controllable switch when the data line is shared for display driving and touch sensing. Preferably, the TDDI chip further comprises a multiplexer associated with an individual touch analog front end (TAFE)

for selecting one of the touch signals to be presented to the individual touch analog front end (TAFE) for touch-signal sensing.

A third aspect of the present invention is to provide touch-scanning schemes usable for the apparatuses disclosed according to the second aspect of the present invention. In each of the schemes, the TDDI chip configures the panel to carry out touch sensing on one selected region at a time, where the panel is divided into a plurality of regions for touch sensing. During the touch-sensing mode, the TDDI chip further performs the following actions.

Regarding the apparatus using the first embodiment of the active in-cell sub-pixel, the TDDI chip configures the panel to provide the second voltage to the Display_Touch line, switch off the TFT in all in-cell sub-pixels and drive the second common electrode of the panel with a voltage following a self-capacitive sensing voltage.

Regarding the apparatus using the second embodiment of the active in-cell sub-pixel, the TDDI chip: configures the panel to provide the second voltage to the Display_Touch line; configures the panel to switch off the TFT in all in-cell sub-pixels in the panel; providing a self-capacitive sensing signal to each data line that is linked to one or more active in-cell touch sub-pixels in the selected region; provides an AC VCOM signal to each data line that is linked to one or more active in-cell touch sub-pixels but not in the selected region, where the AC VCOM signal follows a self-capacitive sensing signal; and drives the common electrode of the panel with the AC VCOM signal.

Regarding the apparatus using the third embodiment of the active in-cell sub-pixel, the TDDI chip: configures the panel to provide the second voltage to the Display_Touch line; configures the panel to switch on the TFT in each of the active in-cell sub-pixels in the selected region; and drives a self-capacitive sensing signal along each data line in the selected region.

Other aspects of the present invention are disclosed as illustrated by the embodiments hereinafter.

BRIEF DESCRIPTION OF THE DRAWINGS:

Embodiments of the invention are described in more detail hereinafter with reference to the drawings, in which:

FIG. 3 depicts a circuit model of a TFT sub-pixel;

FIG. 4 depicts a circuit model of an in-cell touch TFT sub-pixel;

DETAILED DESCRIPTION

The present invention provides a design of the pin count reduction in a TDDI chip using a technique of combining touch-sensing channels with source driving channels. The various embodiments of the present invention can be used for TFT LCD panels with TFTs and common voltage (VCOM) layers being built in the panel. Furthermore, in various embodiments, both touch sensing and display driving use the data lines (namely, source lines) as the means to access touch sensors and display electrodes (or pixel electrodes), respectively, in the panel. In addition, methods and apparatuses as disclosed herein are needed in both the TDDI chip and the display panel to achieve this multiplex use of data lines.

Before the method and the apparatus as disclosed herein are elaborated, a background description on different TFT sub-pixel structures is provided.

A. Background on Different TFT Sub-pixel Structures and Corresponding Circuit Models There are two types of TFT sub-pixel arrangements considered herein. They are the Twisted Nematic (TN) type and the In Plane Switching (IPS) type.

A.1. The TN Type

Figure 1:
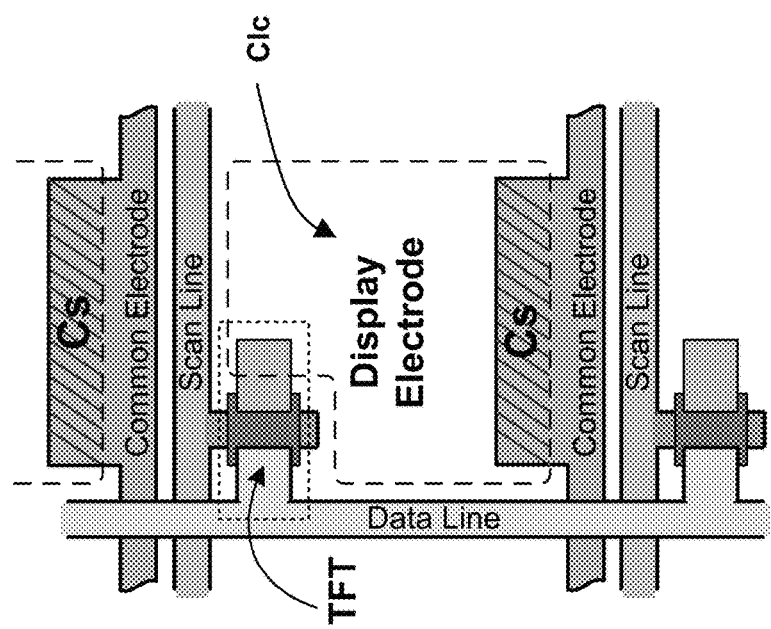
FIG. 1 depicts an example for illustrating a Twisted Nematic (TN) type TFT sub-pixel.

The TN type is a classic arrangement of a sub-pixel structure and is commonly used in a display panel. FIG. 1 depicts an example of a TN-type TFT sub-pixel. As shown in FIG. 1, there are two capacitors within each cell: the Storage Capacitor (labelled Cs in FIG. 1) and the Liquid Crystal Capacitor (labelled Clc in FIG. 1). The capacitors Cs and Clc are connected electrically to a common electrode. In practical implementation, the two common electrodes are physically separated. The Storage Capacitor's common electrode is on the lower glass substrate (i.e. the TFT substrate). The Liquid Crystal Capacitor's common electrode is on the upper glass substrate (i.e. the color filter substrate). The two common electrodes are electrically bonded together through multiple connectors between the lower and upper glass substrates.

A.2. The IPS Type

Figure 2:
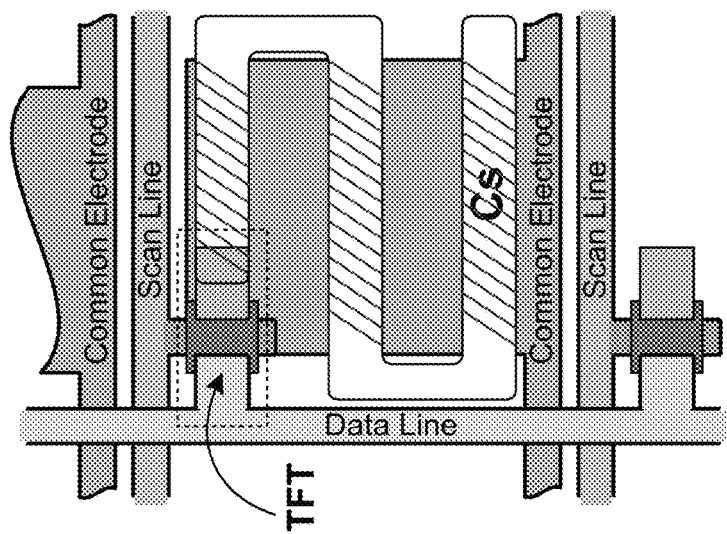
FIG. 2 depicts an example for illustrating an In Plane Switching (IPS) type TFT sub-pixel.

The IPS type is an arrangement optimized for better color reproduction and greater viewing angle. The name "In Plane Switching" is due to the liquid crystal orientation. When the liquid crystal is being switched by an electric field, the rotation is substantially in parallel with the lower and the upper substrates. In other words, the rotation is substantially in perpendicular to the direction of the light source. FIG. 2 depicts an example of an IPS type TFT sub-pixel. Like the TN type, the IPS type has two capacitors within each cell. The Storage Capacitor (Cs) is formed by the overlapping region(s) between the display electrode and the common electrode. It is indicated by the shaded area in FIG. 2. Unlike the TN type, the Liquid Crystal Capacitor (Clc)'s common electrode is on the lower substrate (rather than the upper substrate). The Cs and Clc common electrodes are physically the same electrode and, therefore, are electrically bonded together. Note that the Clc is not shown in FIG. 2. Nevertheless, the IPS type TFT sub-pixel is known in the art, and those skilled in the art can easily identify the Clc from this type of sub-pixel. Typically, the Clc of IPS panel is not a parallel plate capacitor. It is more like a fringing field capacitor.

A.3. Simplified Circuit Model of a TFT Sub-pixel

After understanding the difference between TN type and IPS type TFT sub-pixel structure, a simplified circuit model of a TFT sub-pixel can be developed, as shown in FIG. 3. In FIG. 3, the TFT, the Storage Capacitor (Cs) and the Liquid Crystal Capacitor (Clc) are all connected to the display electrode (also called a pixel electrode). This is common for both TN type and IPS type sub-pixel. The difference between the TN type and the IPS type is in the manner of connecting Common Electrode of the Liquid Crystal Capacitor (Clc). It is encircled by a dotted line shown in FIG. 3. Usually, a TN type panel connects the upper and lower common electrodes together through multiple external connections. However, it is not the case in the present invention as will be elaborated hereinafter.

A.4. Circuit Model of an In-cell Touch TFT Sub-pixel

The circuit model of an In-cell Touch TFT sub-pixel is close to a normal TFT sub-pixel except the symbol of the Liquid Crystal Capacitor (Clc) and its connection on one side (see FIG. 4). One side of the Liquid Crystal Capacitor (Clc) symbol in FIG. 4 is represented by a thicker and longer line while the opposite side is represented by a thinner and shorter line. In case of a TN type TFT panel, this thicker and longer line represents the upper glass substrate's common electrode. The thinner and shorter line in FIG. 4 represents the display electrode that rests on the lower glass substrate. Both electrodes are made of indium tin oxide (ITO). In practical implementation, this upper common electrode is physically much larger than the display electrode. This upper common electrode typically covers a plurality of sub-pixels.

When a finger approaches the upper glass substrate, a capacitor is built up between the finger and the upper common electrode (as indicated in FIG. 4 as Cf). The capacitance of this capacitor is largest when the finger touches the upper glass. Hence, the objective of touch sensing is to detect the change in capacitance of this capacitor, Cf.

For an in-cell touch TFT panel, the same panel is used for both image display and touch sense. Image display and touch sensing are done in a time multiplexing manner. In this respect, this upper common electrode serves the following two purposes: (1) in display driving, this electrode is connected to a common voltage (VCOM); and (2) in touch sensing, this electrode is connected to a self-capacitive sensing circuitry.

The upper common electrodes (as there are multiple upper common electrodes in a single TFT panel) can be regarded as touch sensors. As mentioned above, a 5-inch display can have as many as 500 touch sensors (hence 500 upper common electrodes).

The upper common electrode is connected to a small square symbol in the circuit model of FIG. 4. This small square symbol serves dual purposes:

First, it represents an interconnection point with a neighboring sub-pixel upper common electrode. As stated before, an upper common electrode typically covers a plurality of sub-pixels.

Second, it represents an electrical connection between the lower and the upper glass substrates. However, it only happens to a small number of sub-pixels. A detailed description will follow.

Figure 6:
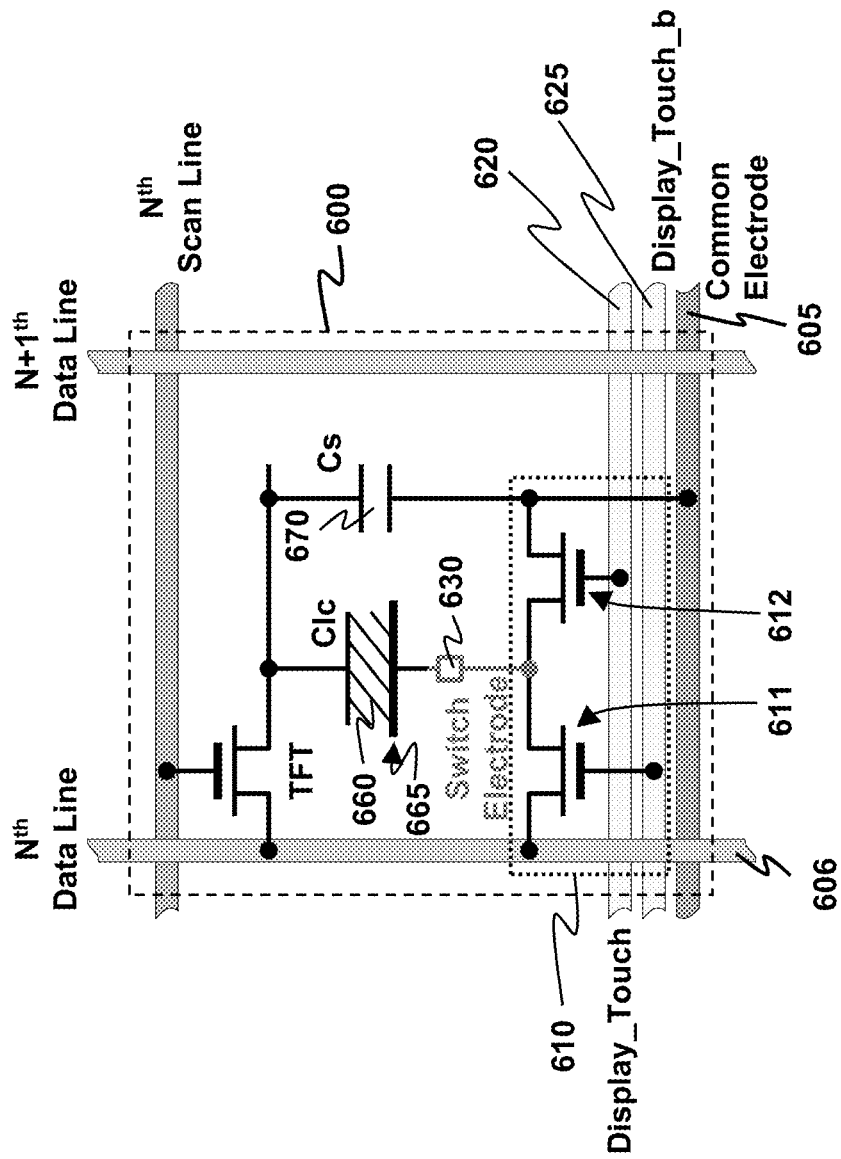
FIG. 6 depicts a first embodiment of an active in-cell touch sub-pixel according to the present invention.
Figure 7:
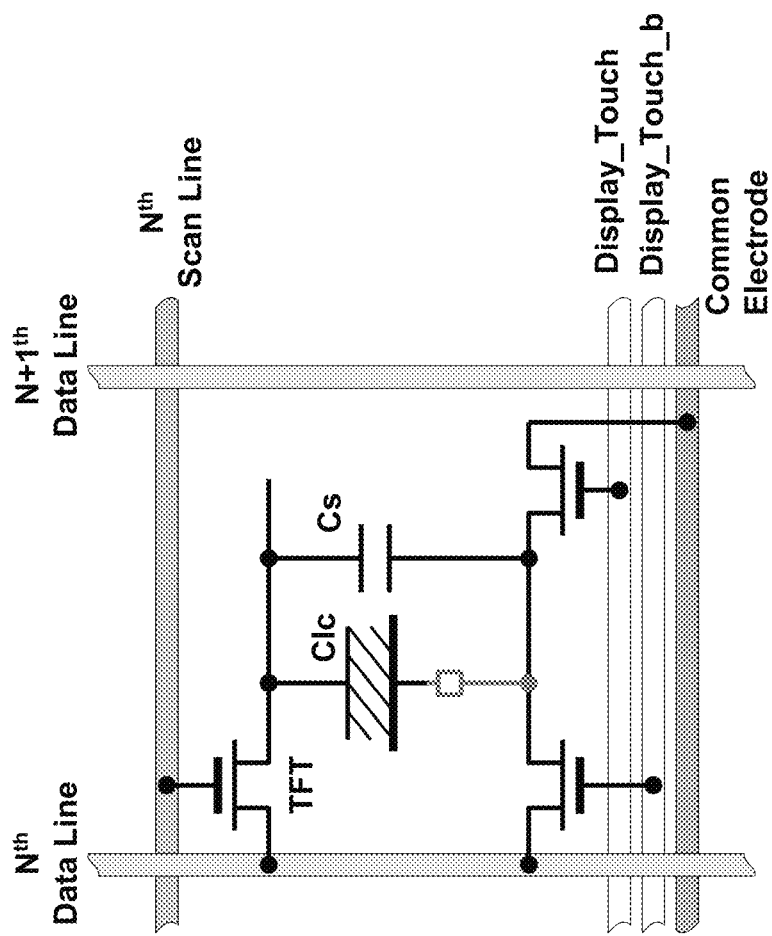
FIG. 7 depicts a second embodiment of an active in-cell touch sub-pixel according to the present invention.
Figure 8:
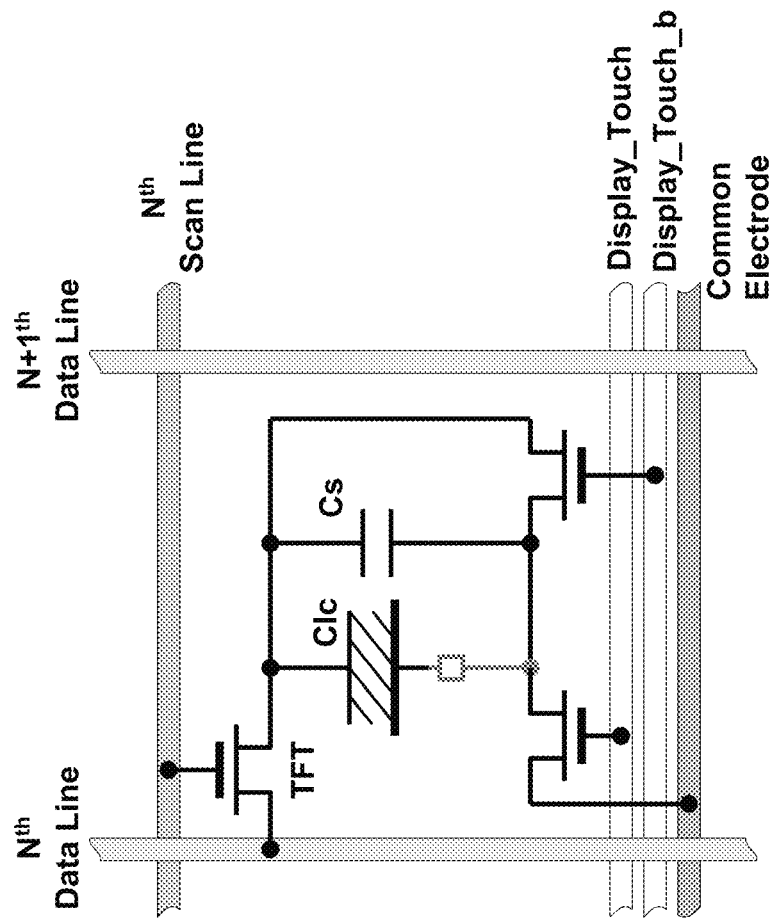
FIG. 8 depicts a third embodiment of an active in-cell touch sub-pixel according to the present invention.

The small square symbol is also used in FIGS. 6-8 and carries the same meaning.

Not all in-cell touch TFT sub-pixels are the same. Some sub-pixels include additional active switching elements so that the upper common electrodes can serve dual purposes for display driving and touch sensing in a time multiplexing manner.

Figure 5:
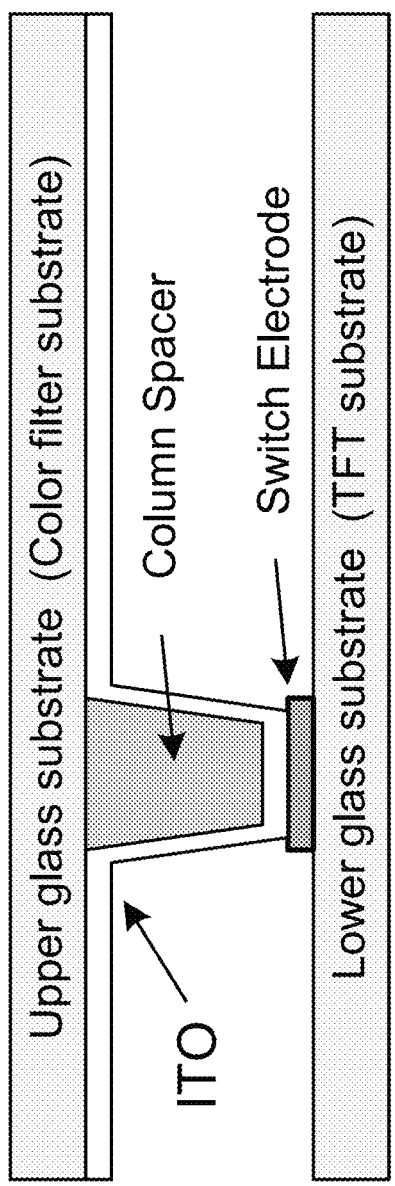
FIG. 5 depicts an example for illustrating a conductive column spacer.

Since the active switching elements are on the lower glass substrate, a means is required to connect electrically between the lower and upper glass substrates. This means is a conductive column spacer. The physical structure of the conductive column spacer is illustrated by an example shown in FIG. 5. The ITO is the upper Common Electrode and the Switch Electrode is the connection to an active switching element.

B. Active In-cell Sub-pixel for Reducing the Pin Count

A first aspect of the present invention is to provide an active in-cell sub-pixel configured such that the pin count of a TDDI is reducible. In this regard, the disclosed active in-cell sub-pixel cooperates with the TDDI in time multiplexing between a display-driving mode and a touch-sensing mode.

B.1. First Embodiment of the Active In-cell Sub-pixel

FIG. 6 exemplarily depicts a first embodiment of the active in-cell sub-pixel according to the present invention. An active in-cell touch sub-pixel 600 is a passive (or basic) in-cell touch sub-pixel plus an additional active switching element 610. The active switching element 610 can be implemented by transistors 611 and 612 as exemplarily illustrated in FIG. 6.

Besides the data line, the scan line and the common electrode, these three elements being commonly used by any TFT sub-pixel, an active in-cell touch sub-pixel needs two additional mode-switching signals called Display_Touch 620 and Display_Touch_b 625 ('b' representing 'bar' as will be explained below). When Display_Touch 620 is logic HIGH, it signals a display-driving mode. When Display_Touch 620 is logic LOW, it represents a touch-sensing mode.

The Display_Touch_b signal 625 is simply a complementary signal that negates the Display_Touch 620. In other words, the meaning of the 'bar' signal is just the opposite of Display_Touch 620.

The first embodiment of the active in-cell touch sub-pixel is the preferred embodiment for a TN type TFT display. It is because the common electrode 665 of the liquid crystal capacitor 660 (Clc) is physically separated from the common electrode 605 of the storage capacitor 670 (Cs).

The small square symbol in FIG. 6 indicates a conductive column spacer connecting the switch electrode 630 (i.e. an extension electrode from the active switching element 610) on the lower glass substrate and the Clc common electrode 665 (it also serves as the touch sensor) on the upper glass substrate.

When the Display_Touch signal is HIGH, the active switching element 610 connects the lower glass common electrode 605 to the switch electrode 630. It makes the upper glass common electrode 665 having the same potential as the lower glass common electrode 605. Then, the display driving can be done by a sequential control of scan lines and driving the display signals (also called the source signals) in parallel through the data lines. This is the display-driving mode.

When the Display_Touch signal is LOW, the active switching element 610 connects a data line 606 to the switch electrode 630. It makes the upper glass common electrode 665 (now used as a touch sensor) following the self-capacitive sensing signal (which is provided through the data line) from the TDDI IC. All the scan lines are deactivated (and so is the TFT connecting the display electrode) during the touch-sensing period. This is the touch-sensing mode.

B.2. Second Embodiment of the Active In-cell Sub-pixel

FIG. 7 exemplarily depicts a second embodiment of the active in-cell touch sub-pixel according to the present invention. This second embodiment is a preferred embodiment for the IPS type TFT display. It is because the common electrode of Clc is physically connected with the common electrode of the storage capacitor.

The small square symbol in FIG. 7 represents a conductive column spacer, which connects the switch electrode (which is on the lower glass substrate) and a touch sensor (which is on the upper glass substrate). Alternatively, the conductive column spacer and the upper glass touch sensor (which is typically made with ITO) can be eliminated. In this case, the common electrodes of both Clc and Cs (at the lower glass substrate) will be used as the touch sensor. Despite an advantage of simplicity, the touch sensitivity is not as good as the counter case with touch sensor on upper glass.

The operation of the active switching element is similar to that of the first embodiment above.

The configuration of the second embodiment in FIG. 7 is similar to the first embodiment shown in FIG. 6 except that, additionally, the storage capacitor (Cs) is electrically connected to the switch electrode.

B.3. Third Embodiment of the Active In-cell Sub-pixel

In the art, it is commonly believed that all LCD suffers from certain level of motion blur which can be caused by the slow response time of liquid crystal or can be due to LCD lowering its refresh rate for low power operation. In short, an LCD with a higher refresh rate results in less motion blur. Black insertion can be employed, which tries to emulate the effect of a CRT TV so as to reduce the aforementioned effect. This technology is based on the principle of inserting a black frame (or black section of a frame) just before updating the display contents. It helps to 'clean' the viewer's eye/brain visual expectation and thereby reduce blur. It is desirable if an active in-cell touch sub-pixel is also configured to provide black insertion.

FIG. 8 exemplarily depicts a third embodiment of the active in-cell touch sub-pixel according to the present invention. The third embodiment is a special arrangement that can be useful when the TFT panel is designed to have black insertion.

In the display-driving mode, the third embodiment works as in the first and the second embodiments.

In the touch-sensing mode, the terminals of the two capacitors (Cs and Clc) are shorted together through the active switching element. Hence, the voltage across the liquid crystal is 0V and thus the TFT panel displays black. During this black out period, the scan line is activated making the TFT switches on. Then, a self-capacitive sensing signal is driven by the TDDI IC, along the data line, through the TFT and the active switching element, and finally, reaching the common electrode. The common electrode (now, acting as a touch sensor) follows the self-capacitive sensing signal that comes from the TDDI IC.

C. TDDI Chips, and Touch-scanning Apparatuses Incorporating Them

A TDDI chip is designed to interface with any of the three embodiments of active in-cell sub-pixel so as to facilitate a reduction of pin count.

Figure 9:
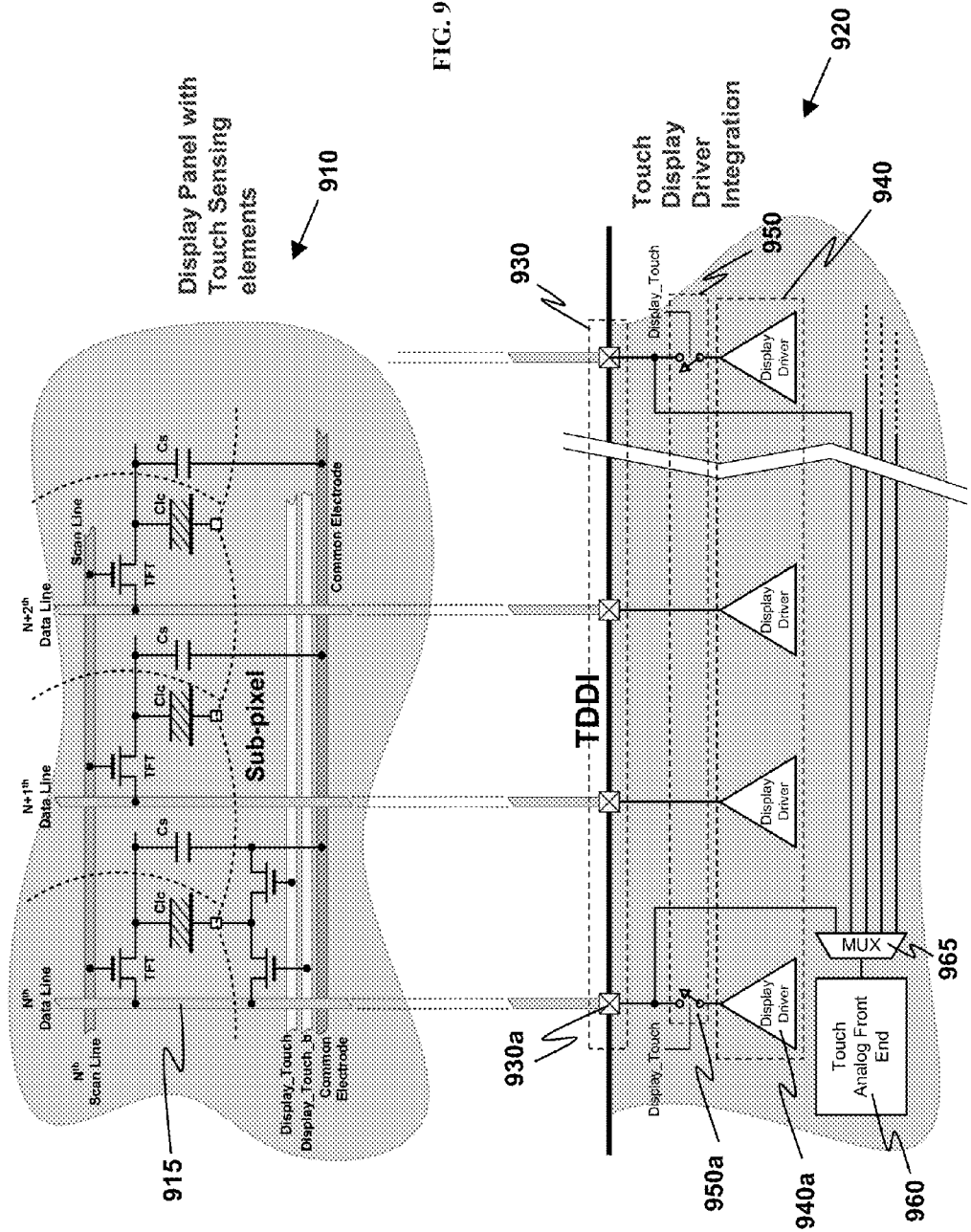
FIG. 9 depicts, in accordance with an embodiment of the present invention, a TDDI chip having apparatuses for interfacing with the active in-cell touch sub-pixel as disclosed herein.

FIG. 9 depicts a TDDI chip interfacing with a display panel with touch-sensing elements in accordance with an exemplary embodiment of the present invention.

In driving a LCD panel with active in-cell sub-pixels, a Gate Driver provides high voltage signals. These include the control of scan lines (which are also called gate lines), Display_Touch line and Display_Touch_b line. These control signals are high voltage because transistors on the TFT panels are coarse FETs being made from amorphous silicon or metal oxide. They can only be turned on by a high voltage.

A Source Driver in the TDDI chip provides relatively low voltage signals. These include signals for display driving and touch sensing. These signals are passed to the sub-pixel cells through the data lines in a time multiplexing manner. In addition, common electrode voltage (also referred to as VCOM in the art) is also generated by the source driver. VCOM is a DC reference signal in display-driving mode and an AC signal in touch-sensing mode.

To reduce the pin count on the TDDI chip, the basic methodology is to combine the display driving and the touch sensing functions on the data lines in a time-multiplex manner. Both the LCD panel and the TDDI chip need to be modified.

In a display panel, there are two types of in-cell touch sub-pixels: active and passive. Active in-cell touch sub-pixel includes additional switching elements. Besides scan lines, data lines and common electrode as in a normal TFT panel, Display_Touch and Display_Touch_b lines are added to toggle between the display-driving mode and the touch-sensing mode. Numerous liquid crystal capacitor's (Clc) common electrodes are interconnected to for a touch-sensing region (touch sensor). This is symbolically drawn as dotted lines linking up the little squares (which represent conductive column spacers) in FIG. 9.

The TDDI chip includes multiplexers to multiplex between display driving and touch sensing. Furthermore, one TAFE can support more than one touch-sensing region. A TAFE is an analog circuitry that can generate excitation energy (normally in the form of multiple voltage cycles) for one or more touch sensor(s) and in return detect the current going forward and backward through the touch sensor(s) as a means for capacitance measurement, where the excitation energy is the energy used for changing the touch sensor(s) from a "ground state" to any particular "potential state".

A second aspect of the present invention is to provide an apparatus comprising a display panel and a TDDI chip, where the display panel employs the active in-cell sub-pixel according to one of the three embodiments thereof disclosed above.

Refer to FIG. 9. It depicts an exemplary embodiment of this apparatus comprising a display panel 910 and a TDDI chip 920 connected together. The TDDI chip 920 comprises a plurality of display drivers 940 each (e.g., the driver 940*a*) for driving one data line (e.g. the data line 915) of the panel 910 during the display-driving mode. In the TDDI chip 920, there is a plurality of pads 930 for making electrical connections to the display panel 910. Each of the pads 930 is connected to one data line of the panel 910, and an individual display driver either directly when the data line is purely for display driving, or via a controllable switch when the data line is shared for display driving and touch sensing. This connection arrangement for the pads 930 is important and its importance is elaborated in detail as follows.

Figure 13:
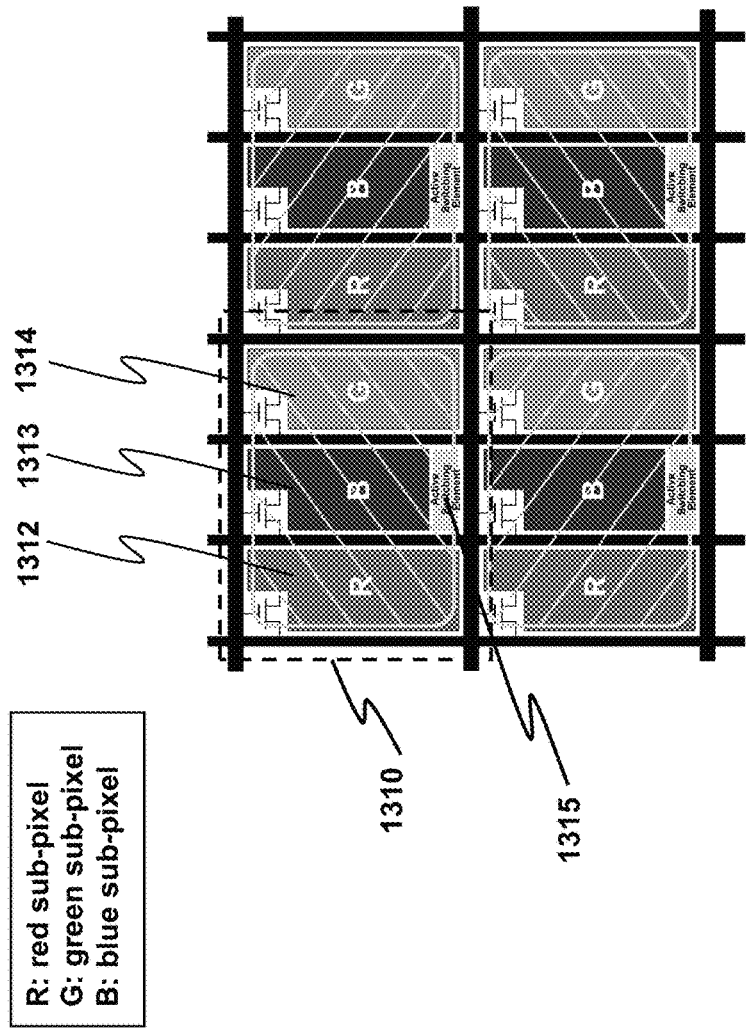
FIG. 13 depicts a first arrangement of active and passive in-cell touch sub-pixels.

As mentioned above, not all in-cell touch sub-pixels have active switching elements. When included, such sub-pixel is called an active in-cell touch sub-pixel. When not included, it is called a passive in-cell touch sub-pixel. For illustration, FIG. 13 depicts a first arrangement of active and passive in-cell touch sub-pixels. In a pixel 1310, a blue sub-pixel 1313 is an active in-cell touch sub-pixel, while a red sub-pixel 1312 and a green sub-pixel 1314 are passive in-cell touch sub-pixels. The box with diagonal hatch pattern 1315 on the pixel 1310 signifies that the three sub-pixels 1312-1314 share the same Clc common electrode.

Figure 14:
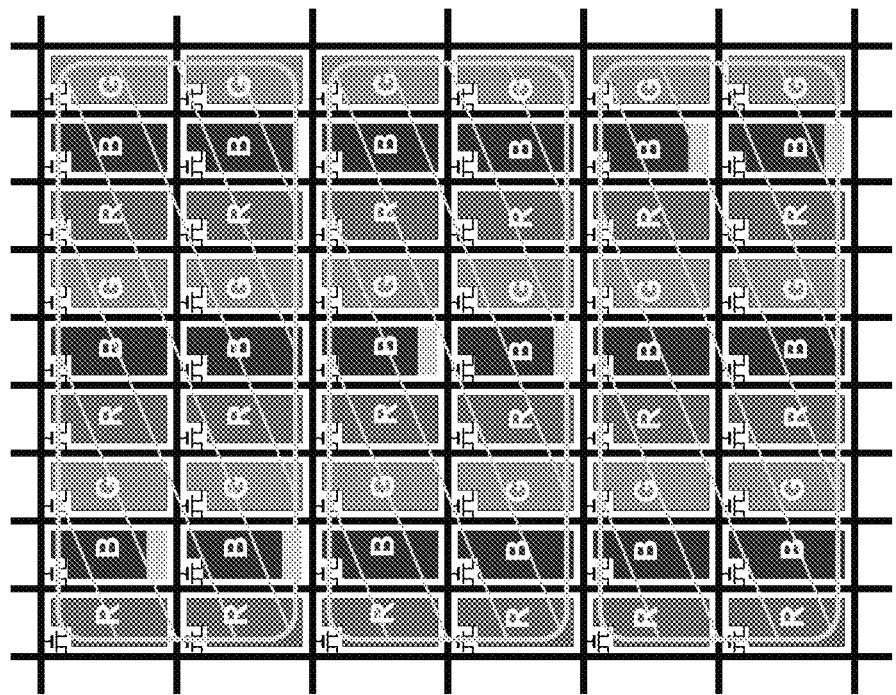
FIG. 14 depicts a second arrangement of active and passive in-cell touch sub-pixels, this second arrangement being more realistic.

In the touch-sensing mode, the box with diagonal hatch pattern 1315 indicates the region of a touch sensor. Generally, the blue sub-pixel 1313 is selected as the active in-cell touch sub-pixel due to the following reason. The active switching element uses up some space within a sub-pixel and reduces the effective sub-pixel area that light can transmit. Since human eyes are less sensitive to the blue color, the blue sub-pixel 1313 is selected. FIG. 14 depicts a second arrangement of active and passive in-cell touch sub-pixels. This arrangement is a more realistic design. More pixels are grouped together to form a touch sensor. In a real application, due to the microscopic size of one pixel, a thousand or more of pixels are grouped together to form a touch sensor. Since the common electrode (or the touch sensor) is physically much bigger that the active switching element and the conductive column spacer, a number of these active elements and conductive spacers are used together to drive the same common electrode. As shown in FIG. 14, blue sub-pixels are always used for embedding the active switching elements. Hence, the blue sub-pixels are smaller in size than red and green sub-pixels.

Generally, most of the blue sub-pixels are intentionally left blank (i.e. without active switching elements). It is to allow a simple touch sense scanning arrangement in the TDDI.

Figure 15:
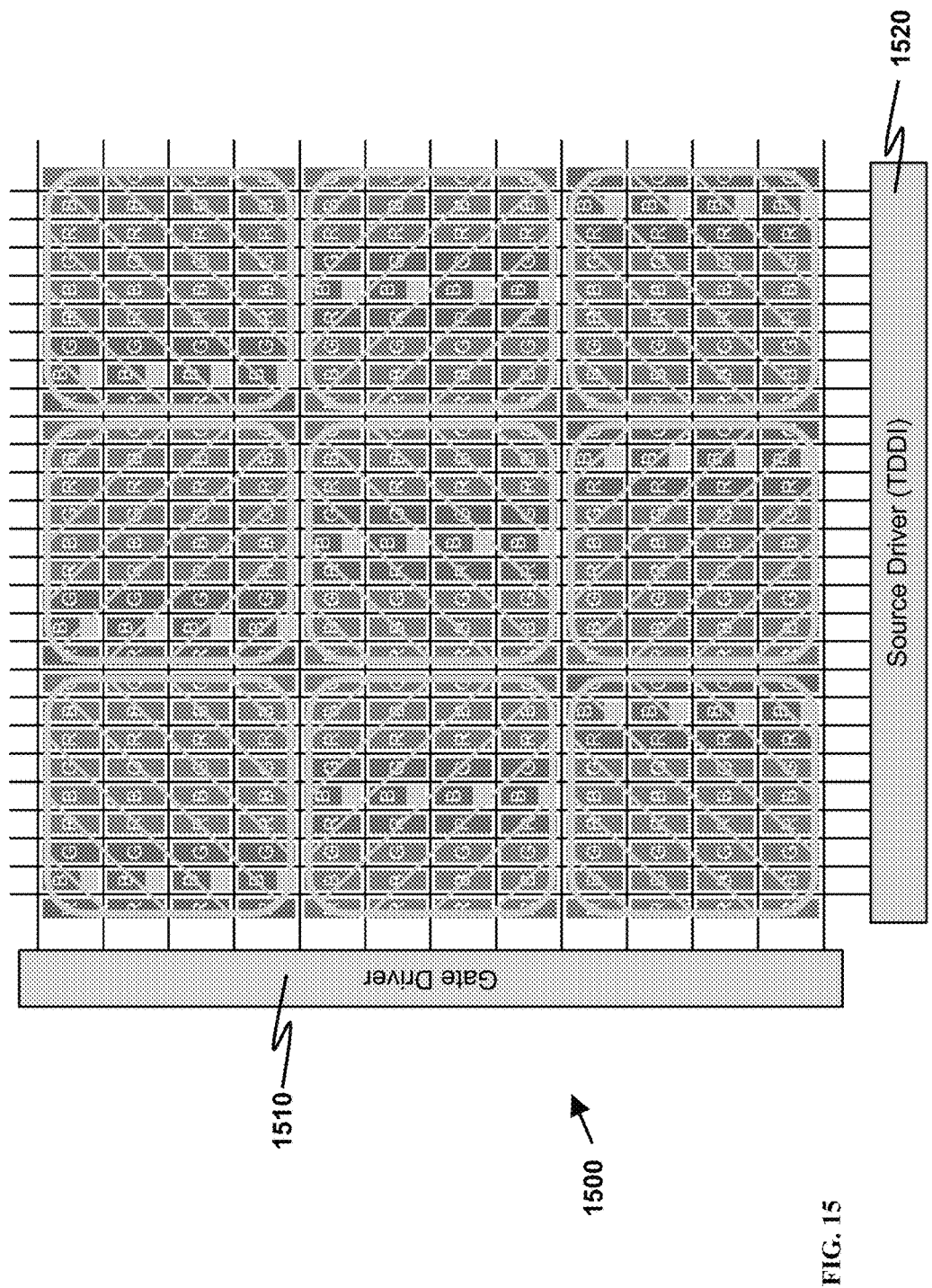
FIG. 15 depicts a simplified view of a layout of a TFT panel.

A detailed description is given as follows with the aid of FIG. 15, which shows a simplified view of a layout of a TFT panel 1500. The TFT panel 1500 is divided into 3×3=9 common electrode regions. Each region is connected to multiple conductive column spacers and active switching elements. The three regions on the 1st row are connected to the 1st, 4th, 7th blue data lines. The three regions on the 2nd row are connected to the 2nd, 5th, 8th blue data lines. The three regions on the 3rd row are connected to the 3rd, 6th, 9th blue data lines. Collectively, each blue data line controls one region. The TFT panel 1500 further includes a gate driver 1510 and a source driver 1520 (TDDI chip). The gate driver 1510 provides high voltage signals. These include the control of scan lines (also called gate lines), Display_Touch line and Display_Touch_b line. These control signals are high voltage because transistors on the TFT panels are coarse FETs being made from amorphous silicon or metal oxide. They can only be turned ON by a high voltage. The source driver 1520 provides relatively low voltage signals. These low voltage signals include signals for display driving and touch sensing. These signals are passed to the sub-pixel cells through the data lines in a time multiplexing manner. In addition, VCOM is also generated by the source driver. VCOM is a DC reference signal in display driving mode and an AC signal in touch sensing mode.

Refer to FIG. 9. FIG. 9 shows that only data lines linked with active in-cell touch sub-pixels have controllable switches. In short, blue data lines have switches whereas red and green data lines do not have switches in-between the pads and the display drivers. The blue data lines are shared for display driving and touch sensing; the red and green data lines are purely for display driving. As an example, the pad 930a is connected to the data line 915 of the panel 910, and is also connected to the display driver 940a via the switch 950a. Preferably, the switch 950a is realized as an active switch in order to be fabricated in the TDDI chip 920. The TDDI chip 920 further comprises one or more TAFEs (one of which is referenced to as 960) for sensing a plurality of touch signals received from the display panel 910 via the plurality of pads 930. Preferably, a multiplexer 965 associated with an individual TAFE 960 in the TDDI chip 920 is used for selecting one of the touch signals to be presented to the individual TAFE 960 for touch-signal sensing.

D. Touch-scanning Sschemes for the Three Embodiments of the Active In-cell Sub-pixel A third aspect of the present invention is to provide touch-scanning schemes usable for the apparatuses disclosed according to the second aspect of the present invention.

D.1. Scheme 1

Figure 10:
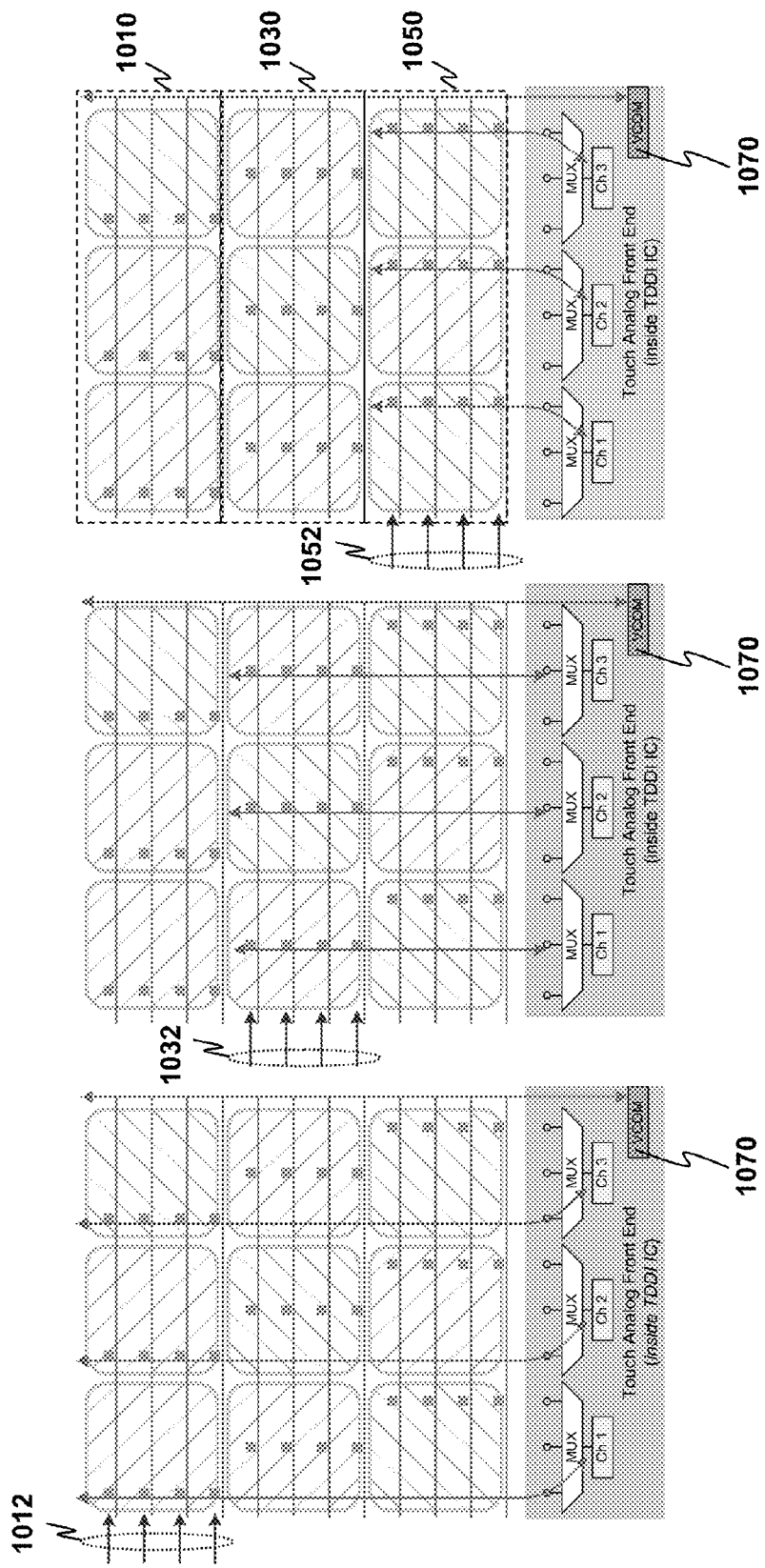
FIG. 10 depicts a first touch-scanning scheme suitable for use with the first embodiment of the active in-cell touch sub-pixel according to the present invention.

Touch-scanning scheme 1, as illustrated in FIG. 10, is an arrangement suitable for TN type TFT display. The three diagrams in FIG. 10 represent the time sequence of touch-scanning (from left to right).

In the forthcoming example, the touch-sensing screen is divided into three regions (namely, the upper region 1010, the middle region 1030 and a lower region 1050). At any one time, the TDDI chip can carry out touch sensing for one of the regions 1010, 1030, and 1050. The arrows 1012, 1032, and 1052 on the left of the TFT panel show which region the TDDI is working on. For this sensing scheme, the number of TAFEs is only one third of the number of touch sensors. On the other hand, this scheme takes 3 times longer to scan through one frame.

Two Issues Needs Special Attention:

First, at any one time, there are 6 out of 9 touch sensors (shown in FIG. 10) not connected to the TAFE. Hence, touch sensors are not synchronously driven by the same voltage source. Parasitic capacitance build-up around the touch sensors under self-capacitive measurement will affect the measurement results.

Figure 16:
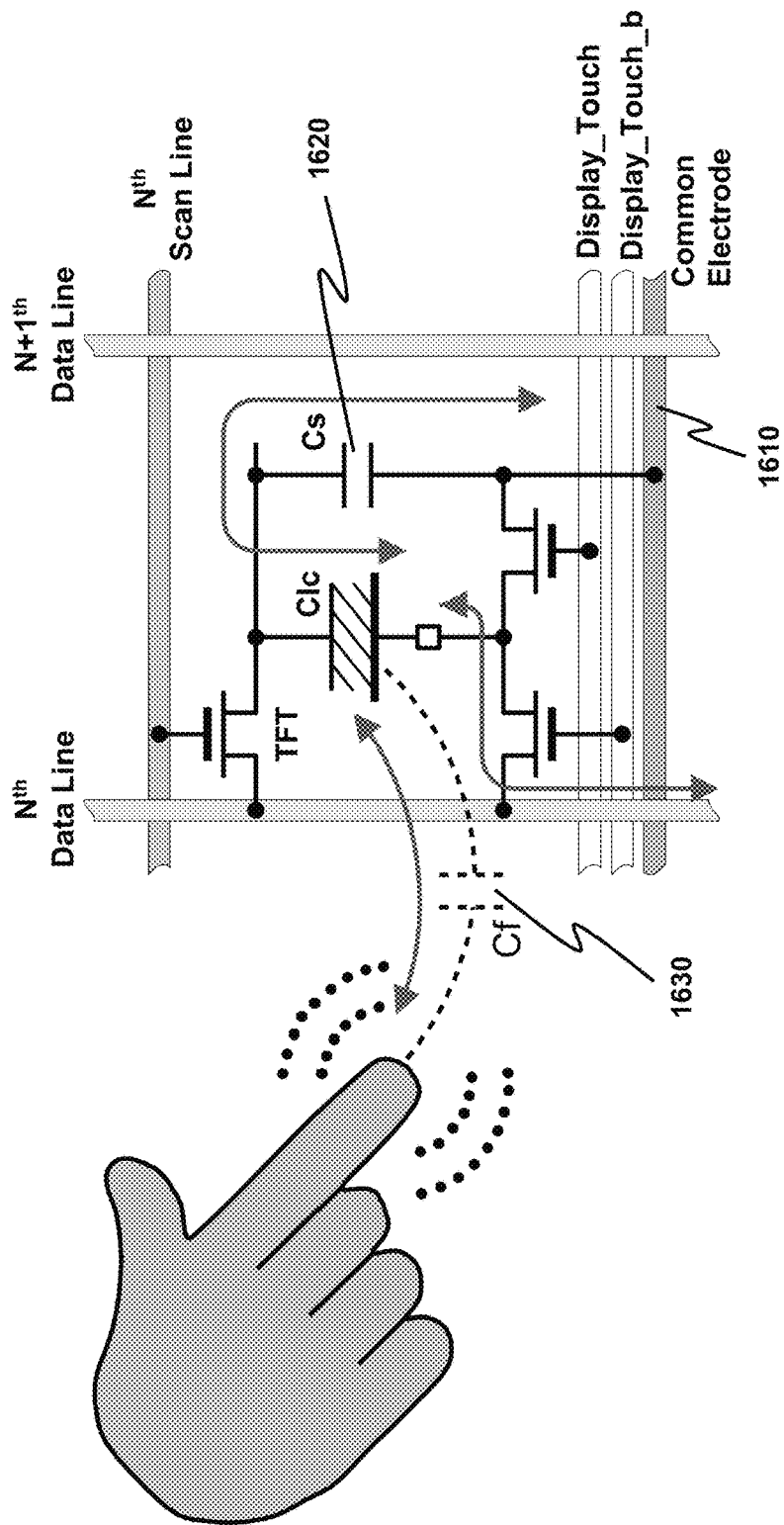
FIG. 16 depicts a situation that a self-capacitive sensing signal is absorbed by a storage capacitor.

Second, the scheme 1 works with the first embodiment of the in-cell touch sub-pixel. Refer to FIG. 16, which depicts a situation that a self-capacitive sensing signal is absorbed by a storage capacitor. The common electrode 1610 of storage capacitor (Cs) 1620 is tied to a DC reference voltage (VCOM) as in display-driving mode, then most of the self-capacitive sensing signal (which comes from the TDDI IC through the data line) will be absorbed by the storage capacitor 1620 rather than the Finger Capacitor (Cf) 1630. It is because the aggregated capacitance of storage capacitors in a region is much larger than the Finger Capacitor 1630.

To resolve the above two issues, the solution is to have the voltage on VCOM 1070 (shown in FIG. 10) following the self-capacitive sensing signal. In this way, no sensing signal will be absorbed by the storage capacitor and no parasitic capacitance will be added to the measurement. Touch-sensing scheme 1 shows that an AC VCOM is provided by the TDDI IC and being distributed to every sub-pixel in the TFT panel.

D.2. Scheme 2

Figure 11:
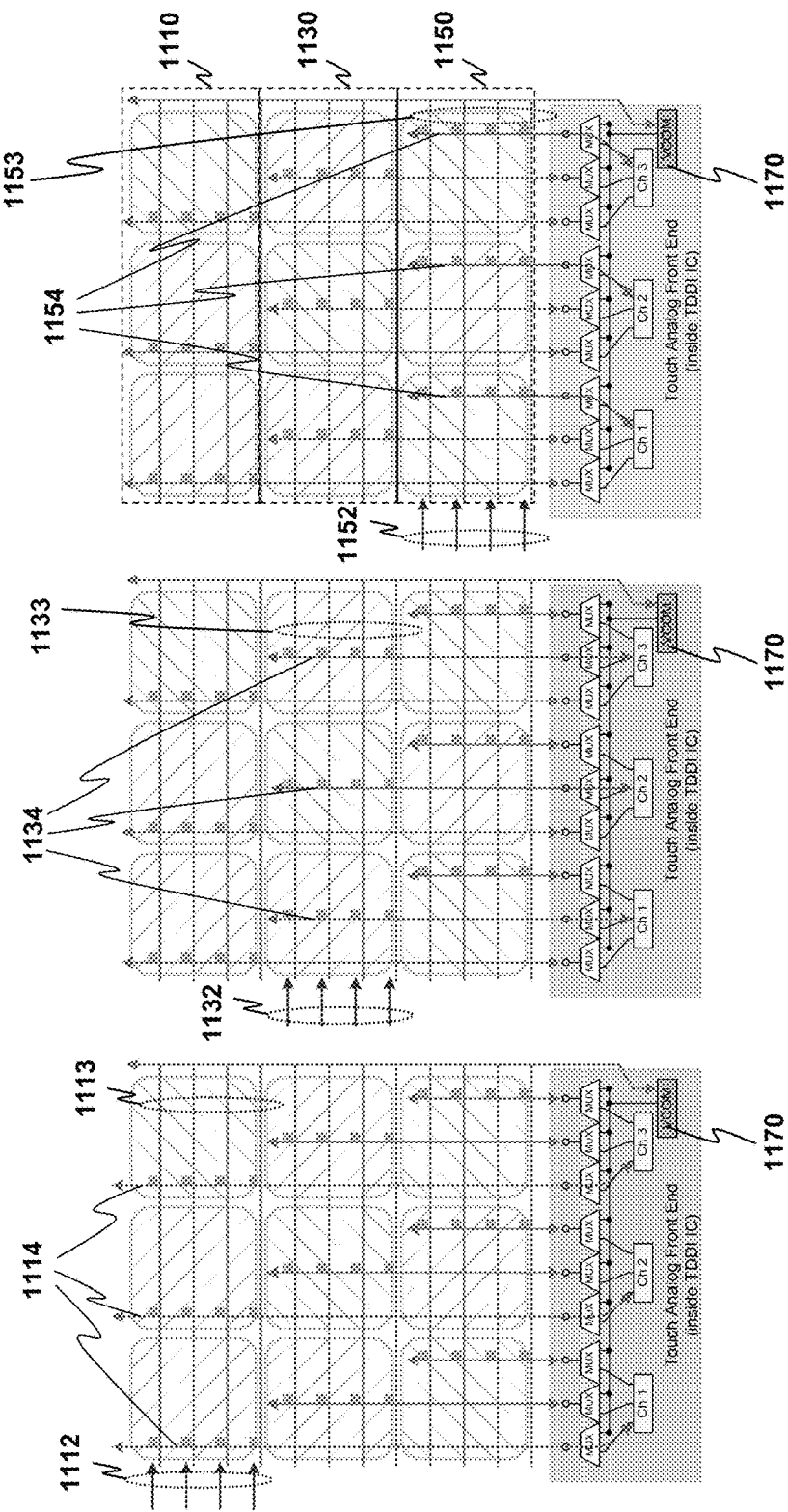
FIG. 11 depicts a second touch-scanning scheme suitable for use with the second embodiment of the active in-cell touch sub-pixel according to the present invention.

Touch-scanning scheme 2, as illustrated in FIG. 11, is an arrangement suitable for IPS type TFT display. The three diagrams in FIG. 11 represent the time sequence of touch-scanning (from left to right).

In the forthcoming example, the touch-sensing screen is divided into three regions (i.e. 1110, 1130, and 1150) as in the previous example with the scheme 1. As before, only one-third TAFE are needed. The arrows 1112, 1132, and 1152 on the left of the TFT panel show which region the TDDI is working on at a particular time instant.

The scheme 2 works with the second embodiment of the in-cell touch sub-pixel. In this case, in every active in-cell touch sub-pixel, the storage capacitor (Cs) common electrode side and the liquid crystal capacitor (Clc) common electrode side are physically linked together (see FIG. 7; basically, they are the same piece of ITO). During the touch-sensing mode, the VCOM signal is isolated from the two capacitors. The TFT for display driving is also OFF during touch-sensing mode. Only a data line is connected to the two capacitors.

In consideration of the IPS type sub-pixel structure and to further improve the signal quality, all data lines that are used to connect to any active in-cell touch sub-pixel need to be driven by an AC VCOM during touch-sensing mode. The AC VCOM is a buffered signal that follows the self-capacitive sensing signal. As shown in FIG. 11, a row of multiplexers is added between the TAFEs and the data lines to serve this purpose. So, for those data lines serving both display driving and touch sensing purposes, they are either connected to the TAFEs or to the AC VCOM during touch-sensing mode. These multiplexers are for the TAFEs; they are not the same controllable switches for display driver.

In addition, the common electrode network needs to be driven by an AC VCOM also. The reason is to eliminate any parasitic capacitance during self-capacitive measurement. (The same reason is also stated in the scheme 1.)

As shown in FIG. 11, the lines 1114, 1134, and 1154 are signals coming from TAFE and the lines 1113, 1133, and 1153 are signals from the VCOM unit. The double arrow at the end of each line means that the signal thereon is AC.

D.3. Scheme 3

Figure 12:
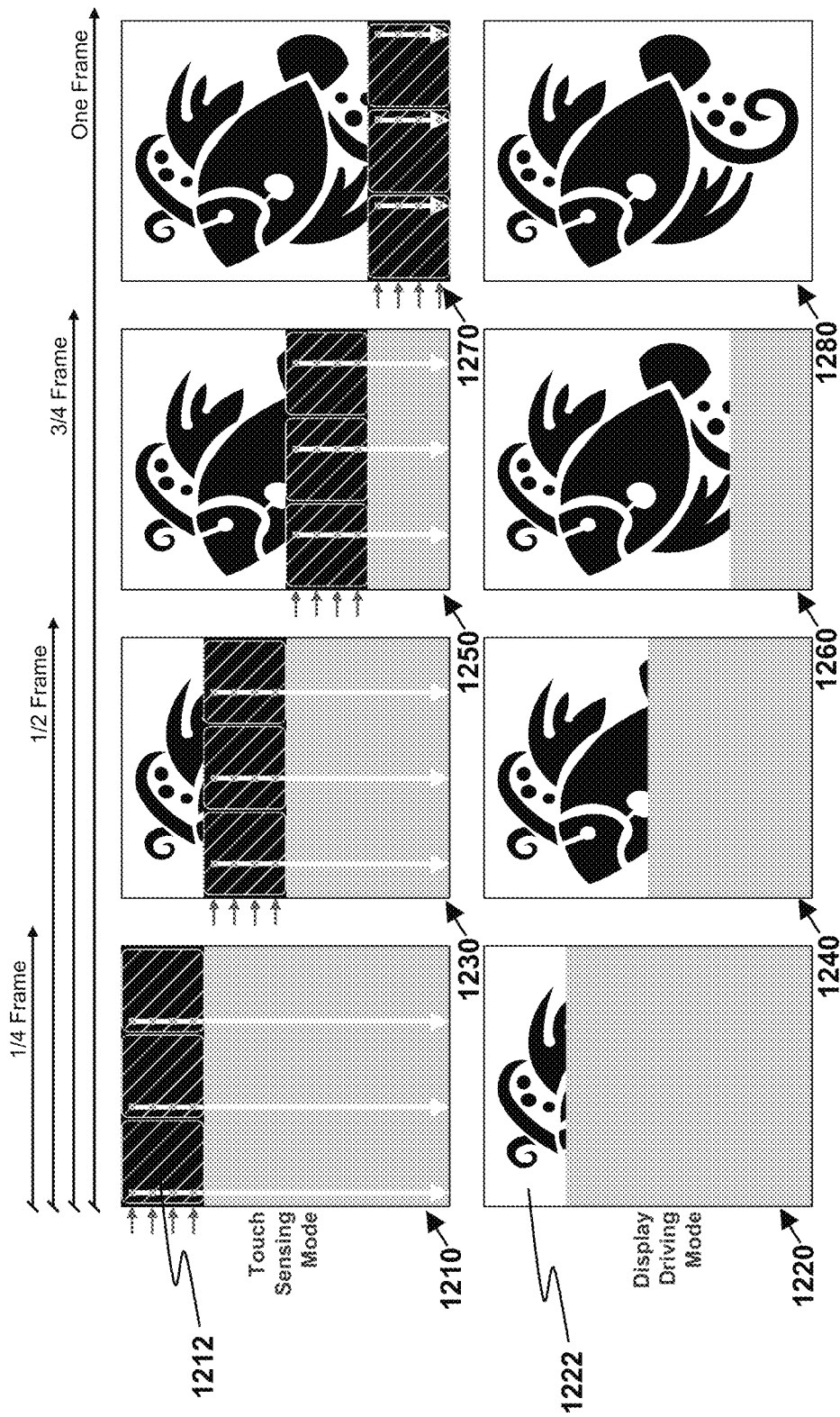
FIG. 12 depicts a third touch-scanning scheme suitable for use with the third embodiment of the active in-cell touch sub-pixel according to the present invention.

Touch-scanning scheme 3, as illustrated in FIG. 12, is an arrangement suitable for IPS type TFT display with black insertion.

The scheme 3 shows the usage of the third embodiment of the in-cell touch sub-pixel. As mentioned above, the aforesaid third embodiment is special in the sense that it takes into account of black insertion during its display drive and touch sense multiplexing.

FIG. 12 shows the time sequence of multiplexing, and FIG. 12 should be read from top to bottom and from left to right so that the sequence of pictures is 1210, 1220, 1230, 1240, 1250, 1260, 1270, and 1280. Hence, the upper left diagram 1210 is the first time instance capture and the lower right diagram 1280 is the last time instance capture. The screen image before display update is a pure grey blank page. The screen image after display update is a black-and-white image of a fish.

At the first time instance (the upper left diagram 1210), all Clc and Cs in all sub-pixels of the first quarter screen are shorted through the active switching elements. Hence, the voltage across the liquid crystal is 0V and the first quarter screen 1212 displays black.

During this black out period, all scan lines correspond to the first quarter are activated to make the TFT switches therein on. Then, self-capacitive sensing signals are driven along the data lines, through the TFT and the active switching elements. Finally, the self-capacitive sensing signals reach the common electrodes. The common electrodes act as touch sensors in the touch-sensing mode.

At the second time instance (the lower left diagram 1220), the system is in the display-driving mode. The first quarter screen is then updated with new image data line by line. This cycle of touch sensing and display driving is carried on quarter by quarter until an end of the frame.

E. Remarks

In practical implementation, the embodiments of the apparatus as disclosed above may be fabricated as an integrated device or an integrated circuit.

In industrial applications, the apparatus can be made as a display driver having a function of touch sensing, or an integrated controller having functionalities of controlling image display and detecting on-screen touch. The apparatus may also be integrated in an interactive display system, a smartphone, or a tablet computer.

The various electronic embodiments of the apparatus as disclosed herein may be implemented using general purpose or specialized computing devices, computer processors, or electronic circuitries including but not limited to application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. An apparatus for displaying an image and sensing a touch, comprising an LCD panel for performing image display and touch sensing, and a touch display driver integration (TDDI) chip for driving the panel to display an image and receiving touch signals from the panel, the panel comprises one or more active in-cell sub pixel and has a Display_Touch line for controlling the sub-pixel to be in a display-driving mode or a touch-sensing mode, the sub-pixel comprising:
   a thin film transistor (TFT) which on and off is controlled by a scan line signal;
   a liquid crystal capacitor comprising a first terminal and a second terminal, the first terminal of the liquid crystal capacitor being a first common electrode of the panel, the second terminal of the liquid crystal capacitor being connected to a data line when the TFT is on;
   a storage capacitor comprising a first terminal and a second terminal, the second terminal of the storage capacitor being connected to the data line when the TFT is on;
   an active switching element comprising a switch electrode connected to the first terminal of the liquid crystal capacitor, the active switching element being controllable by the Display_Touch line such that:
(a) a first voltage on the Display_Touch line configures the active switching element to connect the first terminal of the liquid crystal capacitor to a second common electrode of the panel through the switch electrode, causing the display-driving mode to be turned on; and
(b) a second voltage on the Display_Touch line configures the active switching element to connect the first terminal of the liquid crystal capacitor to the data line through the switch electrode, causing the touch-sensing mode to be turned on;
wherein the TDDI chip comprises:
(a) a plurality of pads each for electrically connecting to one data line of the panel;
(b) one or more touch analog front ends for sensing a plurality of touch signals received from the display panel via the plurality of pads; and
(c) a plurality of display drivers each for driving one data line of the panel, wherein an individual display driver is connected to said one data line either via a pad directly when the data line is purely for display driving, or via a controllable switch when the data line is shared for display driving and touch sensing.

2. The sub-pixel of claim 1, wherein the first terminal of the storage capacitor is connected to the second common electrode.

3. The sub-pixel of claim 2, wherein:
the first common electrode is located on an upper glass substrate of the panel; and
the second common electrode is located on a lower glass substrate of the panel.

4. A method for touch sensing by the apparatus of claim 3, comprising:
the TDDI chip configuring the panel to carry out touch sensing on one selected region at a time, where the panel is divided into a plurality of regions for touch sensing; and
during the touch-sensing mode, the TDDI chip:
(a) configuring the panel to provide the second voltage to the Display_Touch line;
(b) configuring the panel to switch off the TFT in all in-cell sub-pixels in the panel; and
(c) driving the second common electrode of the panel with a voltage following a self-capacitive sensing voltage.

5. The sub-pixel of claim 1, wherein the first terminal of the storage capacitor is connected to the switch electrode.

6. The sub-pixel of claim 5, wherein the first common electrode and the second common electrode are common and are located on a lower substrate of the panel, the first and the second common electrodes being collectively referred to as a common electrode.

7. A method for touch sensing by the apparatus of claim 6, comprising:
the TDDI chip configuring the panel to carry out touch sensing on one selected region at a time, where the panel is divided into a plurality of regions for touch sensing; and
during the touch-sensing mode, the TDDI chip:
(a) configuring the panel to provide the second voltage to the Display_Touch line;
(b) configuring the panel to switch off the TFT in all in-cell sub-pixels in the panel;
(c) providing a self-capacitive sensing signal to each data line that is linked to one or more active in-cell touch sub-pixels in the selected region;
(d) providing an AC VCOM signal to each data line that is linked to one or more active in-cell touch sub-pixels but not in the selected region, the AC VCOM signal following a self-capacitive sensing signal; and
(e) driving the common electrode of the panel with the AC VCOM signal.

8. The apparatus of claim 1, wherein the TDDI chip further comprises a multiplexer associated with an individual touch analog front end for selecting one of the touch signals to be presented to the individual touch analog front end for touch-signal sensing.

9. An apparatus for displaying an image and sensing a touch, comprising an LCD panel for performing image display and touch sensing, and a touch display driver integration (TDDI) chip for driving the panel to display an image and receiving touch signals from the panel, the panel comprises one or more active in-cell sub-pixel and has a Display_Touch line for controlling the sub-pixel to be in a display-driving mode or a touch-sensing mode, the sub-pixel comprising:
a thin film transistor (TFT) which on and off is controlled by a scan line signal;
a liquid crystal capacitor comprising a first terminal and a second terminal, the second terminal of the liquid crystal capacitor being connected to a data line when the TFT is on;
a storage capacitor comprising a first terminal and a second terminal, the second terminal of the storage capacitor being connected to the data line when the TFT is on;
an active switching element comprising a switch electrode connected to the first terminal of the liquid crystal capacitor and to the first terminal of the storage capacitor, the active switching element being controllable by the Display_Touch line such that:
(a) a first voltage on the Display_Touch line configures the active switching element to connect the first terminals of the liquid crystal capacitor and of the storage capacitor to a common electrode of the panel through the switch electrode, causing the display-driving mode to be turned on; and
(b) a second voltage on the Display_Touch line configures the active switching element to short the first and second terminals of the liquid crystal capacitor and of the storage capacitor, causing the touch-sensing mode to be turned on while the panel displays black
wherein the (TTDI) chip comprises:
(a) a plurality of pads each for electrically connecting to one data line of the panels;
(b) one or more touch analog front ends for sensing a plurality of touch signals received from the display panel via the plurality of pads; and
(c) a plurality of display drivers each for driving one data line of the panel, wherein an individual display driver is connected to said one data line either via a pad directly when the data line is purely for display driving, or via a controllable switch when the data line is shared for display driving and touch sensing.

10. The sub-pixel of claim 9, wherein the sub-pixel is of Twisted Nematic type.

11. The sub-pixel of claim 9, wherein the sub-pixel is of In Plane Switching type.

12. A method for touch sensing by the apparatus of claim 9, comprising:
- the TDDI chip configuring the panel to carry out touch sensing on one selected region at a time, where the panel is divided into a plurality of regions for touch sensing; and
- during the touch-sensing mode, the TDDI chip:
  - (a) configuring the panel to provide the second voltage to the Display_Touch line;
  - (b) configuring the panel to switch on the TFT in each of the active in-cell sub-pixels in the selected region; and
  - (c) driving a self-capacitive sensing signal along each data line in the selected region.

* * * * *